(12) United States Patent
Natori et al.

(10) Patent No.: US 12,370,958 B2
(45) Date of Patent: Jul. 29, 2025

(54) DEVICE STORAGE HOLDER FOR VEHICLE

(71) Applicant: TOYOTA JIDOSHA KABUSHIKI KAISHA, Toyota (JP)

(72) Inventors: Michi Natori, Toyota (JP); Tomoya Takeuchi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/543,794

(22) Filed: Dec. 18, 2023

(65) Prior Publication Data

US 2024/0198920 A1   Jun. 20, 2024

(30) Foreign Application Priority Data

Dec. 20, 2022 (JP) .................................. 2022-203370

(51) Int. Cl.
*B60R 11/02* (2006.01)
*B60R 11/00* (2006.01)

(52) U.S. Cl.
CPC .......... *B60R 11/02* (2013.01); *B60R 11/0241* (2013.01); *B60R 2011/0012* (2013.01)

(58) Field of Classification Search
CPC ................. B60R 11/02; B60R 11/0241; B60R 2011/0012; B60R 2011/0075
USPC ..... 224/929, 275; 296/24.34; D12/415, 416; 297/188.01
See application file for complete search history.

(56) References Cited

U.S. PATENT DOCUMENTS

| | | | | |
|---|---|---|---|---|
| 4,611,734 | A | * | 9/1986 | Luecking ............ B60R 11/0241 224/567 |
| 5,358,307 | A | * | 10/1994 | Shafer ..................... B60R 7/043 297/188.21 |
| D365,820 | S | * | 1/1996 | Bentley ......................... D12/416 |
| 5,556,017 | A | * | 9/1996 | Troy ................... B60R 11/0241 297/188.17 |
| 5,836,496 | A | * | 11/1998 | Levin .................. B60R 11/0241 379/426 |
| D615,478 | S | * | 5/2010 | Hynes .......................... D12/415 |
| 8,616,605 | B2 | * | 12/2013 | Hipshier ................... B60R 7/04 296/37.8 |
| 9,783,124 | B2 | * | 10/2017 | Catlin .................. H04B 1/3877 |
| 9,925,898 | B2 | * | 3/2018 | Shin ....................... B60N 2/763 |
| 10,421,410 | B2 | * | 9/2019 | Villar Mesa ............ B60R 11/02 |
| 10,967,806 | B2 | * | 4/2021 | Pliego ..................... B60R 16/02 |
| 11,480,292 | B2 | * | 10/2022 | Channon ............. F16M 11/041 |
| D985,472 | S | * | 5/2023 | Ernstsson .................... D12/415 |
| 11,643,019 | B2 | * | 5/2023 | Rhee .......................... B60R 7/04 296/24.34 |
| D1,022,853 | S | * | 4/2024 | Porcherot .................... D12/415 |

(Continued)

FOREIGN PATENT DOCUMENTS

WO   2015/115192 A1   8/2015

*Primary Examiner* — Justin M Larson
(74) *Attorney, Agent, or Firm* — Dinsmore & Shohl LLP

(57) ABSTRACT

The device storage holder comprises a main body portion and a support arm. The body includes a backward inclined surface, a lower protrusion, and an upper protrusion. A lower inclined surface and an upper inclined surface are formed on a rear surface of the support arm. In side view, an extension from the lower inclined surface intersects the upper surface of the lower protrusion. In a further side view, an extension from the upper inclined surface intersects the backward inclined surface.

5 Claims, 7 Drawing Sheets

(56) References Cited

U.S. PATENT DOCUMENTS

| | | |
|---|---|---|
| D1,024,908 S * | 4/2024 | Dong .......................... D12/415 |
| 2025/0136019 A1* | 5/2025 | Philipsenburg ......... B60R 11/02 |

* cited by examiner

DEVICE STORAGE HOLDER FOR VEHICLE

CROSS REFERENCE TO RELATED APPLICATION

This application claims priority to Japanese Patent Application No. 2022-203370, filed on Dec. 20, 2022, which is incorporated herein by reference in its entirety including the specification, claims, drawings, and abstract.

TECHNICAL FIELD

In this specification, a device storage holder provided in a vehicle is disclosed.

BACKGROUND

For example, WO 2015/115192 A1 discloses an onboard speaker unit. The speaker unit includes a mechanism for holding an electronic device. The electronic device is, for example, a mobile music player or a mobile phone.

In some cases, a holder is disposed on the side of a seat in a cabin, and an electronic device is held by the holder. At this time, the occupant may see the display of the electronic device. For example, the line of sight of the occupant sitting on the passenger seat moves from the front, which is the traveling direction of the vehicle, to the display of the electronic device. Further, while the vehicle stops, the line of sight of the driver moves from the front to the display of the electronic device. And the driver glances at the display.

The seat may be provided with a seat slide mechanism. By using the seat slide mechanism, the front and rear positions of the seat can be adjusted in accordance with the length of the arm and the length of the foot of the occupant. The distance between the electronic device and the occupant is changed by adjusting the front-rear position of the seat.

In particular, as the distance between the occupant and the electronic device becomes closer, the depression angle, i.e., the angle of the line of sight of the occupant from the front to the display of the electronic device increases.

Accordingly, in the present specification, a vehicle device storage holder is disclosed. The device storage holder is capable of suppressing an increase in line-of-sight movement from the front to the display of the electronic device even when the distance between the occupant and the electronic device becomes close.

SUMMARY

In this specification, a device storage holder for a vehicle is disclosed. A device storage holder is disposed at a side of a vehicle seat including a seat slide mechanism. The device storage holder houses a flat electronic device. The device storage holder comprises a main body portion and a support arm. The support arm extends in the vehicle width direction. The support arm is disposed forward of the body and separated from the body. The body includes a backward inclined surface, a lower protrusion, and an upper protrusion. These are all formed on the front end portion of the main body portion. The backward inclined surface faces forward. Further, the top of the backward inclined surface is positioned rearward of the bottom of the backward inclined surface. The lower protrusion is disposed below the backward inclined surface. The lower protrusion protrudes forward from the backward inclined surface. The top protrusion is disposed above the backward inclined surface. The top protrusion protrudes forward from the backward inclined surface. A lower inclined surface and an upper inclined surface are formed on a rear surface of the support arm. The upper inclined surface is connected to the upper end of the lower inclined surface. In side view, an extension from the lower inclined surface intersects the upper surface of the lower protrusion. In a further side view, an extension from the upper inclined surface intersects the backward inclined surface.

According to the above configuration, the flat electronic device can be supported by the first support (in other words, in the vertical position). In the first support, the back surface of the electronic device is supported by a lower inclined surface. Further, the bottom surface of the electronic device is supported by the lower protrusion. Further, the electronic device can be supported by the second support (in other words, the lay-down position). In the second support, the back surface of the electronic device is supported by the upper inclined surface. Further, in particular in the second support in which the bottom surface of the electronic device is supported by the backward inclined surface, the electronic device is tilted more than in the first support, so that an increase in line-of-sight movement from the front to the display of the electronic device is suppressed.

In the above configuration, a convex portion may be formed at the front end of the upper inclined surface. In this case, the angle between the lower surface of the upper protrusion and the horizontal plane is smaller than the angle between the upper inclined surface and the horizontal plane.

According to the above configuration, the electronic device can be supported at three points of the convex portion, the lower portion of the front end of the upper protrusion, and the backward inclined surface.

In the above configuration, the edge of the front end lower portion of the upper protrusion may have a curved surface shape. The convex portion may also have a curved surface shape.

According to the above configuration, when the electronic device is supported at three points of the convex portion, the lower portion of the front end of the upper protrusion, and the backward inclined surface, it is possible to suppress damage to the electronic device.

In the above configuration, the front end of the upper protrusion may be disposed rearward of the front end of the lower protrusion.

According to the above configuration, when the electronic device is supported by the first support (vertical position), the support angle of the electronic device can be finely adjusted between the lower inclined surface and the upper protrusion.

In the above configuration, the electronic device holder may have an intermediate protrusion. In side view, an intermediate protrusion is formed below the intersection of the extension line from the upper inclined surface and the backward inclined surface. The intermediate protrusion protrudes forward from the backward inclined surface. The protruding length of the intermediate protrusion is shorter than the protruding length of the lower protrusion and the protruding length of the upper protrusion.

According to the above configuration, when the electronic device is supported by the second support (lay-down position), the electronic device can be hooked on the intermediate protrusion, and the support is stabilized.

The device storage holder for a vehicle disclosed in the present specification can suppress an increase in line-of-sight movement from the front to the display of the electronic device even when the distance between the occupant and the electronic device becomes close.

BRIEF DESCRIPTION OF DRAWINGS

Embodiment(s) of the present disclosure will be described based on the following figures, wherein.

DESCRIPTION OF EMBODIMENTS

Figure 1:
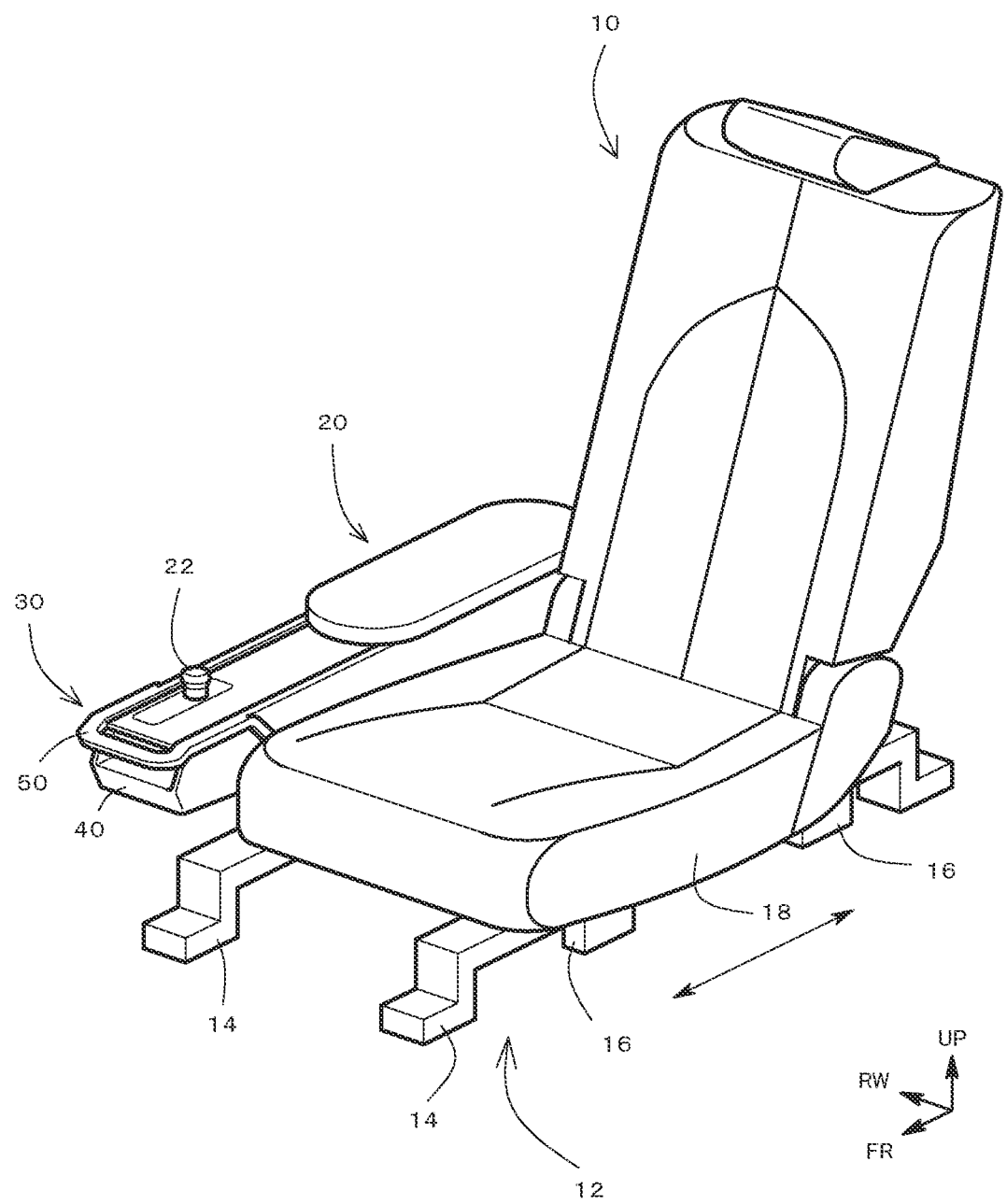
FIG. 1 is a perspective view illustrating a vehicle compartment, in which the device storage holder for a vehicle according to the present embodiment is mounted.

Hereinafter, a device storage holder for a vehicle according to the present embodiment will be described with reference to the drawings. The shapes, materials, numbers, and numerical values described below are illustrative. These shapes, materials, numbers, and numerical values can be appropriately changed according to the specifications of the vehicle device storage holder. In the following, the same reference numerals are given to the same elements in all the drawings.

In FIGS. 1 to 7, an orthogonal coordinate system including an FR axis, an RW axis, and an UP axis is used to represent the position and direction of each component. The FR axis is a vehicle longitudinal axis whose positive direction is the front of the vehicle. The RW axis is a vehicle width direction axis whose positive direction is the right side of the vehicle. The UP axis is a vertical axis of the vehicle in which the upward direction is a positive direction.

<Vehicle Interior Configuration>

FIG. 1 illustrates the interior of a cabin. A device storage holder 30 for a vehicle according to the present embodiment is mounted in the vehicle compartment. Hereinafter, as appropriate, the vehicle device storage holder 30 is simply referred to as a storage holder 30.

The storage holder 30 is disposed on the side of the vehicle seat 10. For example, the storage holder 30 is disposed inside the vehicle seat 10 in the vehicle width direction. For example, the vehicle seat 10 may be a driver seat or a passenger seat. As described later, the storage holder 30 is provided at the front end of the console box 20.

The vehicle seat 10 includes a seat slide mechanism 12. The seat slide mechanism 12 includes a seat rail 14 and a seat slider 16. The seat rail 14 extends in the longitudinal direction of the vehicle. For example, a pair of seat rails 14, 14 are disposed at the vehicle seat ends in the vehicle width direction.

The seat slider 16 is movable back and forth on the seat rail 14. A seat cushion 18 of the vehicle seat 10 is installed on the seat slider 16. For example, a handle (not shown) is provided on the side of the seat cushion 18. The release/stop of the forward/backward movement of the seat slider 16 is switched in accordance with the operation of the handle. The seat slide mechanism 12 allows the vehicle seat 10 to move in the front-rear direction. That is, the relative front and rear positions of the vehicle seat 10 and the storage holder 30 are changed.

A console box 20 is disposed at the side of the vehicle seat 10. The console box 20 is a housing component and is disposed at the center of the vehicle compartment in the vehicle width direction. For example, the console box 20 is disposed between the driver's seat and the passenger's seat. A storage space and a shift lever 22 are disposed on the console box 20. A storage holder 30 is disposed at the front end of the console box 20. An instrument panel (not shown) is disposed in front of the storage holder 30. For example, the console box 20 is formed by resin molding.

<Configuration of Storage Holder>

Figure 2:
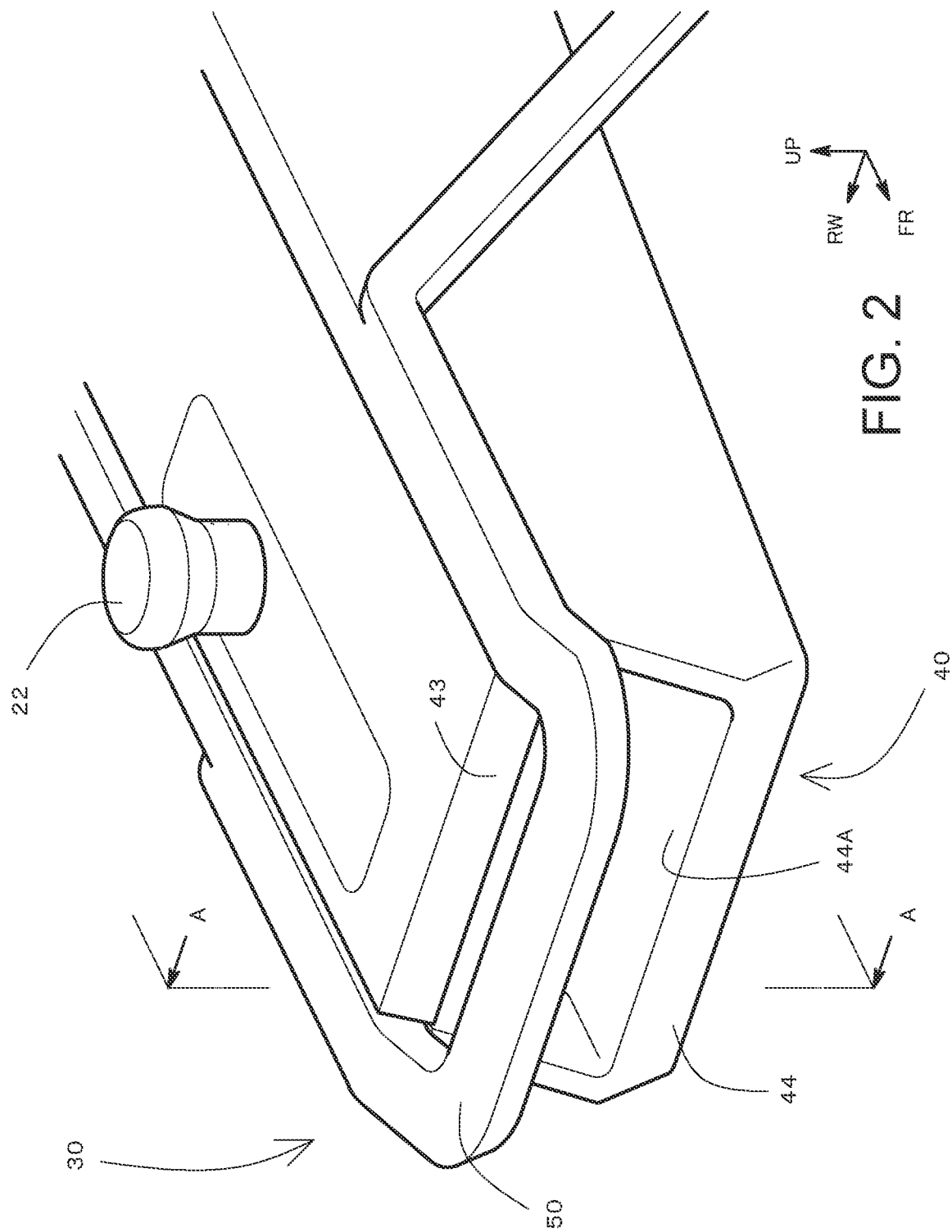
FIG. 2 is a perspective view of the device storage holder for a vehicle according to the present embodiment.
Figure 3:
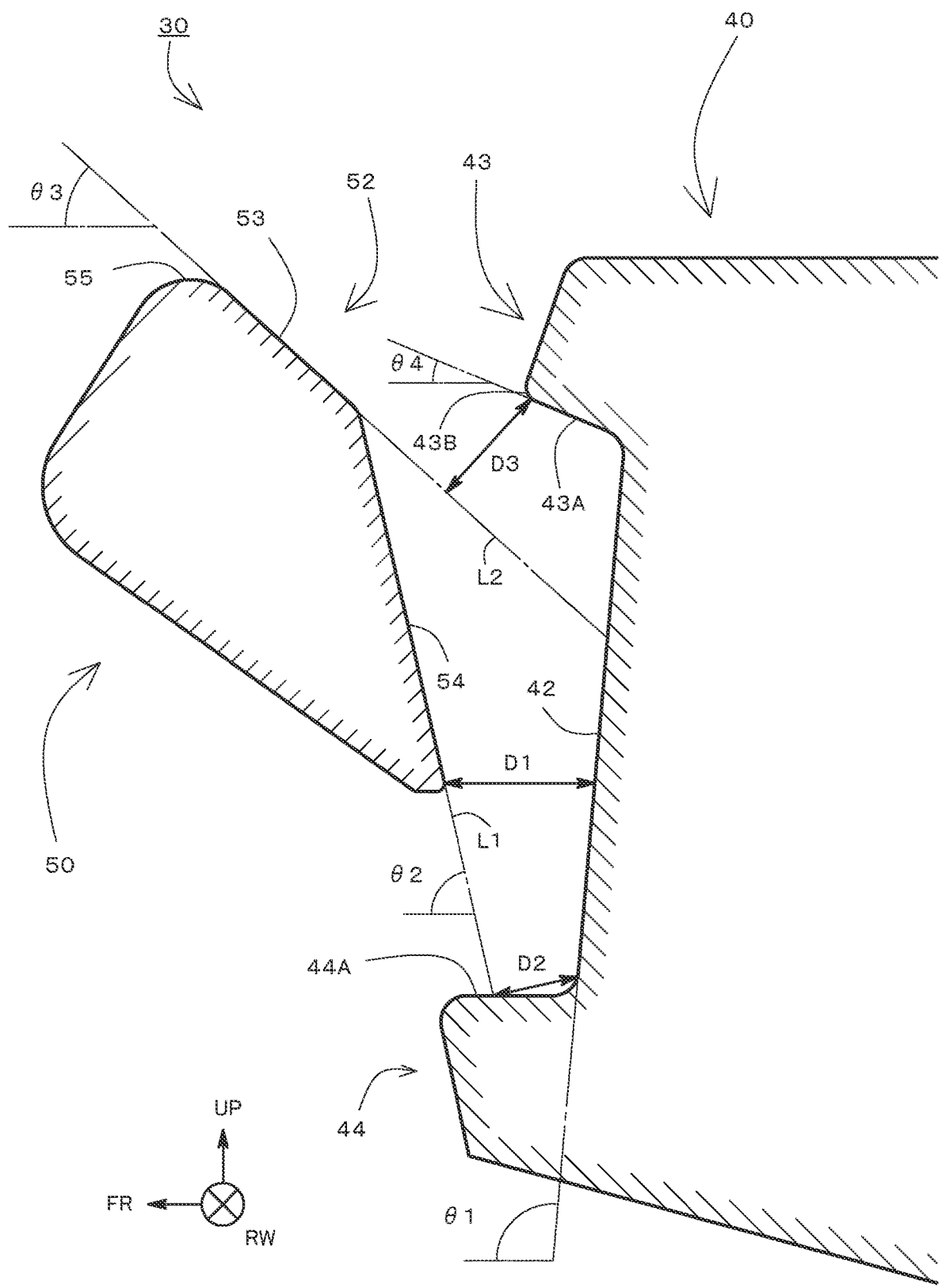
FIG. 3 is a cross-sectional view taken along the line A-A of FIG. 2.
Figure 4:
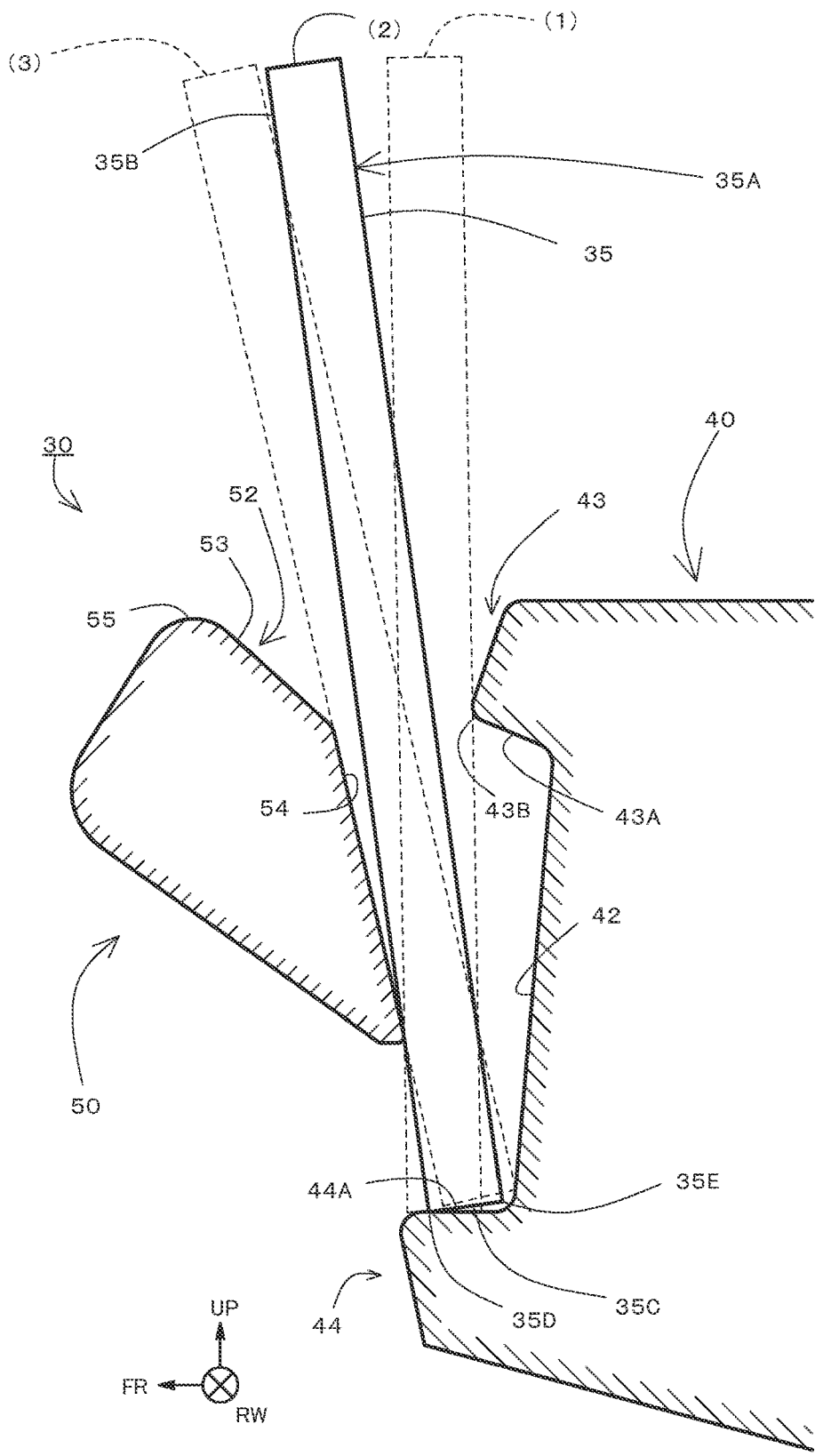
FIG. 4 is a side sectional view showing an example in which the electronic device is supported by a first support (vertical position).
Figure 5:
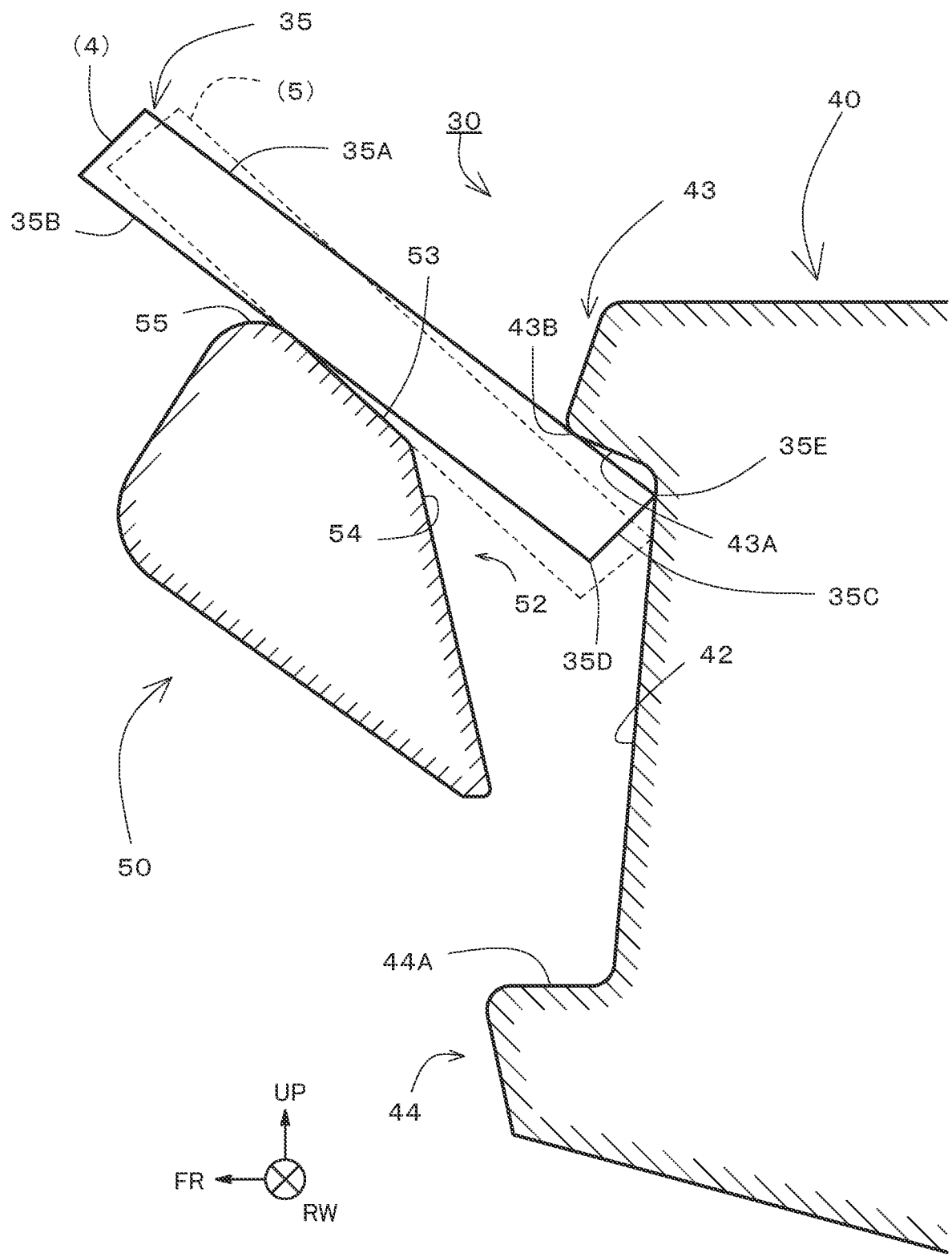
FIG. 5 is a side cross-sectional view showing an example in which the electronic device is supported by a second support (lay-down position).

FIG. 2 is an enlarged perspective view of the storage holder 30 according to the present embodiment. FIG. 3 is a cross-sectional view taken along the line A-A of FIG. 2. As illustrated in FIGS. 4 and 5, the storage holder 30 is capable of storing flat electronic devices 35. The electronic device 35 includes a display surface 35A. The electronic device 35 is a rectangular plate-shaped device such as a smartphone or a tablet terminal.

As illustrated in FIGS. 2 and 3, the storage holder 30 includes a main body 40 and a support arm 50. For example, the surfaces of the main body 40 and the support arm 50 are covered with resin. For example, a resinous skin material such as polypropylene or ABS resin covers the surfaces of the main body 40 and the support arm 50. Such a skin material has a predetermined elasticity and friction coefficient. Since the skin material having a predetermined friction coefficient comes into contact with the electronic device 35, the electronic device 35 being supported is prevented from slipping off from the storage holder 30.

A backward inclined surface 42, an upper protrusion 43, and a lower protrusion 44 are formed on a front end portion of the body 40. The backward inclined surface 42 is a surface facing forward. The top of the backward inclined surface 42 is positioned rearward of the bottom of the backward inclined surface 42. For example, the inclination angle θ1 of the backward inclined surface 42 with respect to the horizontal plane is greater than 90°.

A lower protrusion 44 is disposed below the backward inclined surface 42. The lower protrusion 44 protrudes forward beyond the backward inclined surface 42. For example, referring to FIG. 4, the protruding length of the lower protrusion 44 exceeds the thickness of the electronic device 35. The lower protrusion 44 is rectangular in side view. The lower protrusion 44 has an upper surface 44A. In the first support (vertical position), the top surface 44A supports the bottom surface 35C of the electronic device 35. For example, the upper surface 44A may be parallel to the horizontal plane.

The upper protrusion 43 is disposed above the backward inclined surface 42. The upper protrusion 43 protrudes forward beyond the backward inclined surface 42. The protruding length of the upper protrusion 43 may be equal to that of the lower protrusion 44. In this case, since the surface 42 is inclined backwardly, the front end of the upper protrusion 43 disposed above the backward inclined surface 42 is disposed rearward of the front end of the lower protrusion 44. By disposing the upper protrusion 43 rearward of the lower protrusion 44, the angle of the electronic device 35 can be finely adjusted during the first support (vertical position) as illustrated in FIG. 4.

As illustrated in FIG. 3, the upper protrusion 43 is rectangular in side view. The upper protrusion 43 includes a lower surface 43A. For example, the angle θ4 between the lower surface 43A and the horizontal plane is smaller than the angle θ3 between the upper inclined surface 53 of the support arm 50 and the horizontal plane. As described later, by performing such angle setting, it is possible to support the electronic device 35 at three points as illustrated in FIG. 5.

Further, the upper protrusion 43 has an edge portion 43B at the lower front end. The edge portion 43B is an intersection of the front surface of the upper protrusion 43 and the lower surface 43A. The edge portion 43B has, for example, a curved surface shape. As illustrated in FIG. 5, when the electronic device 35 is supported by three points in a second support, the edge portion 43B of the upper protrusion 43 comes into contact with the display surface 35A of the electronic device 35. Since the edge portion 43B has a curved surface shape, damage to the display surface 35A is avoided.

The support arm 50 extends around the body 40. As illustrated in FIG. 2, the support arms 50 extend in the front-rear direction on both sides in the vehicle width direction of the main body 40. Further, the support arm 50 is disposed forward of the main body 40. The support arm 50 is separated from the main body 40. Further, the support arm 50 extends in the vehicle width direction.

As illustrated in FIG. 3, the rear surface 52 of the support arm 50 includes an upper inclined surface 53 and a lower inclined surface 54. The lower inclined surface 54 faces the backward inclined surface 42 of the main body 40. The extension line L1 drawn from the lower inclined surface 54 in a side view (the direction in FIG. 3) intersects the upper surface 44A of the lower protrusion 44.

The upper inclined surface 53 is connected to the upper end of the lower inclined surface 54. The extension line L2 drawn from the upper inclined surface 53 in a side view intersects the backward inclined surface 42 of the main body 40. The angle θ2 of the lower inclined surface 54 with respect to the horizontal plane is larger than the angle θ3 of the upper inclined surface 53 with respect to the horizontal plane. For example, the relationship between angles θ2 and θ3 is θ3<θ2<90°.

A convex portion 55 is disposed at an upper-front end of the upper inclined surface 53. The convex portion 55 has an upward convex curved surface shape. As will be described later, the back surface 35B of the electronic device 35 is supported by the convex portion 55 during the second support (lay-down position). Since the convex portion 55 has a curved surface shape, damage to the rear surface 35B of the electronic device 35 is avoided.

The separation distance of the support arm 50 with respect to the main body 40 is determined based on the support posture of the electronic device 35. For example, the separation distance D1 at a point closest to the lower inclined surface 54 and the backward inclined surface 42 exceeds the thickness of the electronic device 35. The distance D2 from the intersection on the upper surface 44A of the extension line L1 drawn from the lower inclined surface 54 to the backward inclined surface 42 is, for example, less than the thickness of the electronic device 35. Further, the separation distance D3 at the point where the extension line L2 of the upper inclined surface 53 and the upper protrusion 43 are closest to each other exceeds the thickness of the electronic device 35.

<Support Mode of the Storage Holder>

FIG. 4 shows an example in which the storage holder 30 supports the electronic device 35 by a first support (vertical position). As described above, the electronic device 35 has a rectangular plate shape. The electronic device 35 is supported by the storage holder 30 such that the longitudinal direction is the vertical direction.

The back surface 35B of the electronic device 35 abuts against and is supported by the lower inclined surface 54 of the support arm 50. Here, as illustrated in FIG. 3, the separation distance D2 between the extension line L1 and the backward inclined surface 42 is less than the thickness of the electronic device 35. Thus, the support mode of the electronic device 35 includes the following three modes.

(1) The display surface 35A of the electronic device 35 contacts the edge portion 43B of the upper protrusion 43 in line contact (point contact in the side cross section). The rear surface 35B of the electronic device 35 contacts the lower inclined surface 54 of the support arm 50 in line contact (point contact in side cross section). Further, the bottom surface 35C of the electronic device 35 contacts the upper surface 44A of the lower protrusion 44 in surface contact (line contact in the side cross section).

(2) The rear surface 35B of the electronic device 35 contacts the lower inclined surface 54 of the support arm 50 in line contact. The rear corner portion 35D of the electronic device 35 contacts the upper surface 44A of the lower protrusion 44 in line contact.

(3) The rear surface 35B of the electronic device 35 contacts the lower inclined surface 54 of the support arm 50 in surface contact. Further, the front corner portion 35E of the electronic device 35 contacts the backward inclined surface 42 of the main body 40 inline contact.

Since the mode (2) in which the electronic device 35 is supported by the storage holder 30 only in line contact is included in the support mode, various electronic devices 35 having different shapes and thicknesses can be housed in the storage holder 30.

FIG. 5 shows an example in which the storage holder 30 supports the electronic device 35 by a second support (lay-down position). In FIG. 5, the posture of the electronic device 35 is determined such that the lateral direction of the rectangular plate-shaped electronic device 35 is the vertical direction. In other words, the electronic device 35 is placed in landscape orientation. However, when the distance from the storage holder 30 to the instrument panel (not shown) is sufficient, the posture of the electronic device 35 may be determined so that the longitudinal direction is the vertical direction (front-rear direction).

In the second support, the support mode of the electronic device 35 by the storage holder 30 includes the following two modes. In any of the following two modes, the electronic device 35 is supported by the storage holder 30 in a state of rising with respect to the horizontal plane.

(4) The rear surface 35B of the electronic device 35 contacts the convex portion 55 of the support arm 50 in line contact with each other. The display surface 35A of the electronic device 35 contacts the edge portion 43B of the upper protrusion 43 in line contact with each other. Further, the front corner 35E of the electronic device 35 contacts the backward inclined surface 42 in line contact with each other.

(5) The rear surface 35B of the electronic device 35 contacts the upper inclined surface 53 of the support arm 50 in surface contact. Further, the front corner portion 35E of the electronic device 35 contacts the backward inclined surface 42 in line contact.

In particular, in order to enable the support mode (4), the shape of the upper protrusion 43 is determined such that the inclination angle θ4 (see FIG. 3) of the lower surface 43A of the upper protrusion 43 is smaller than the inclination angle θ3 of the upper inclined surface 53. That is, as illustrated in FIG. 5, in the support mode (4), the lower surface 43A is separated upward from the electronic device 35. As a result, the bottom surface 35C of the electronic device 35 can access the backward inclined surface 42, thereby support mode (4) is possible.

As described above, also in the second support, since the mode (4) in which the electronic device 35 is supported by the storage holder 30 in line contact is included, various electronic devices 35 having different shapes and thicknesses can be stored in the storage holder 30.

<Line of Sight of Occupant>

Figure 6:
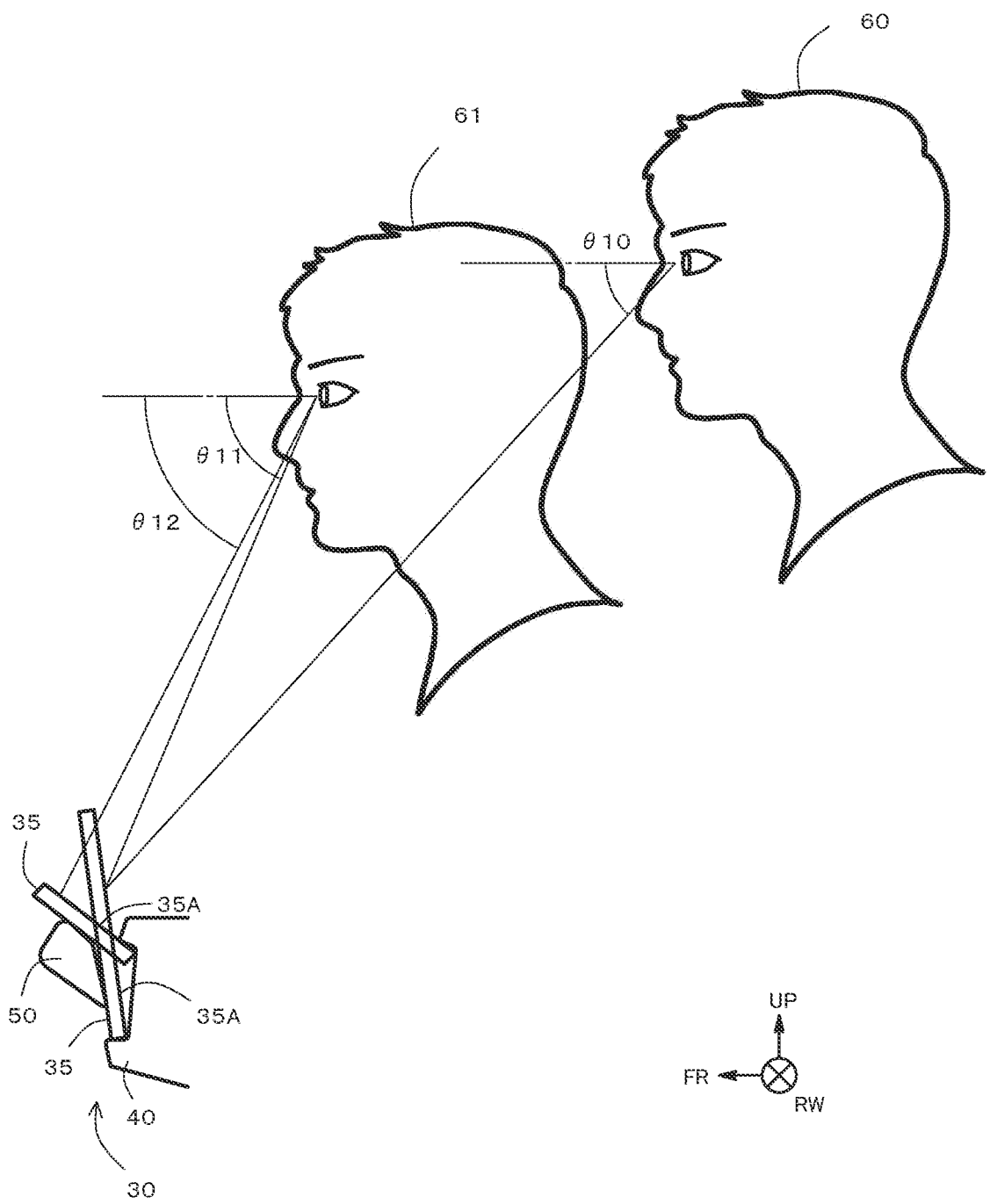
FIG. 6 is a diagram illustrating a difference in depression angle depending on a seating position of an occupant and a type of supporting an electronic device.

FIG. 6 exemplifies the line of sight of the occupant. The relatively tall occupant 60 moves the vehicle seat 10 rearward using the seat slide mechanism 12 (see FIG. 1). The relatively short occupant 61 moves the vehicle seat 10 forward using the seat slide mechanism 12.

FIG. 6 shows the depression angle θ11 when the occupant 61 moves the line of sight from the front to the display surface 35A of the electronic device 35 in the first support mode. FIG. 6 shows the depression angle θ10 when the occupant 60 moves the line of sight from the front to the display surface 35A of the electronic device 35 in the first support mode. At this time, the relationship between the depression angles θ10 and θ11 is θ10<θ11. That is, the amount of movement of the line of sight is larger in the occupant 61.

When the storage holder 30 supports the electronic device 35 in the second support (lay-down position), the depression angle θ12 of the occupant 61 is smaller than the depression angle θ11 in the first support (θ12<θ11). In this way, by enabling the second support, even when the distance between the occupant 61 and the electronic device 35 becomes close to each other, an increase in the line-of-sight movement from the front to the display surface 35A of the electronic device 35 is suppressed.

<Another Example of the Storage Holder>

Figure 7:
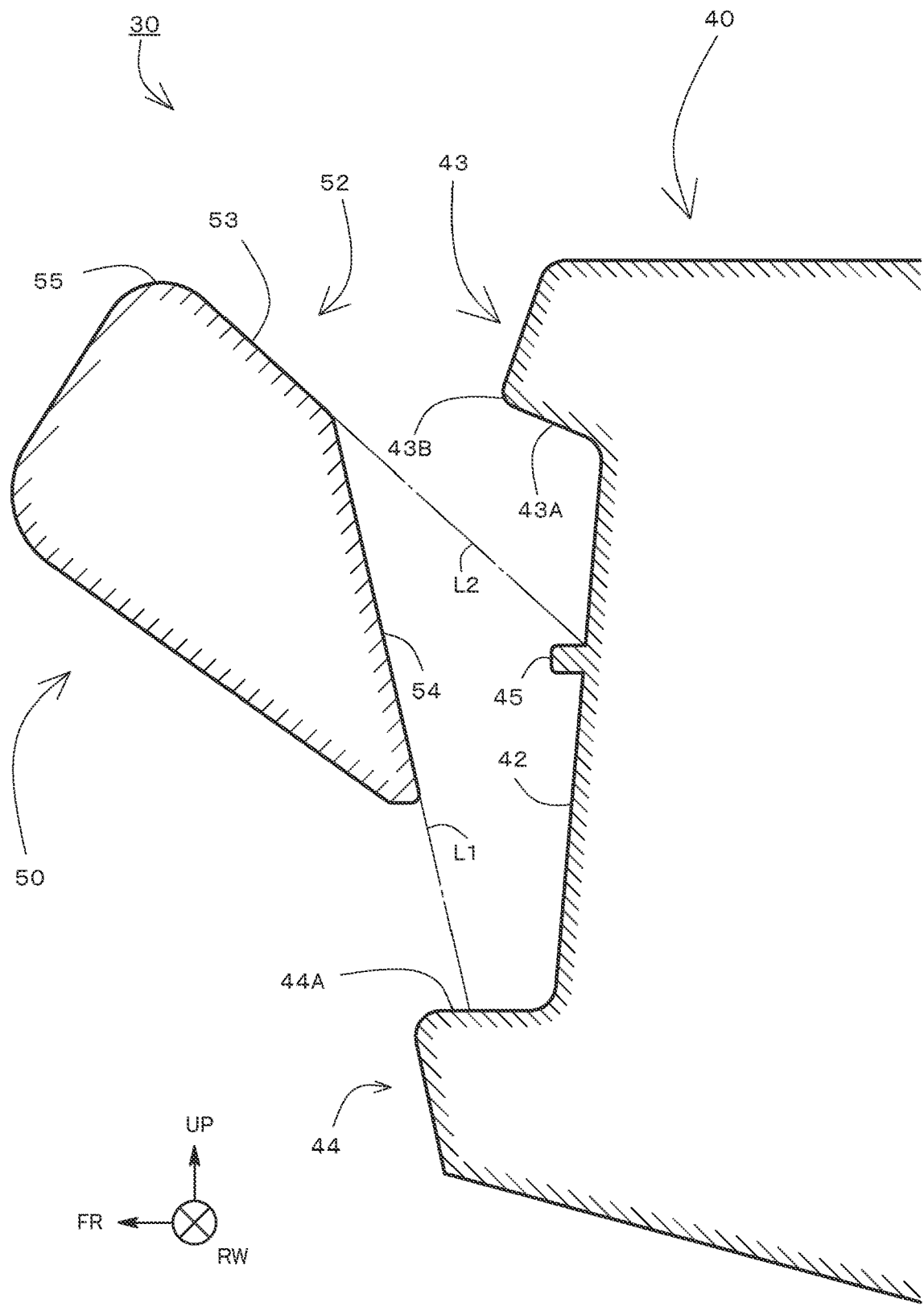
FIG. 7 is a side sectional view illustrating the device storage holder for a vehicle according to another example of the present embodiment.

FIG. 7 shows another example of the storage holder 30 according to the present embodiment. In this example, an intermediate protrusion 45 is disposed on the backward inclined surface 42. Other configurations are the same as those of the above-described storage holder 30.

The intermediate protrusion 45 is formed below the intersection of the extended line L2 drawn from the upper inclined surface 53 and the backward inclined surface 42. The intermediate protrusion 45 protrudes forward beyond the backward inclined surface 42. The intermediate protrusion 45 is formed such that the protrusion length is shorter than the protrusion lengths of the lower protrusion 44 and the upper protrusion 43.

When the electronic device 35 is supported by the storage holder 30 by the second support (lay-down position), the intermediate protrusion 45 catches on the rear corner portion 35D (see FIG. 5) of the electronic device 35. This suppresses the electronic device 35 from slipping down and shifting to the first support. In particular, even when the vehicle is traveling on a bad road, the intermediate protrusion 45 reliably supports the electronic device 35.

Further, since the protruding length of the intermediate protrusion 45 is shorter than that of the upper protrusion 43 and the lower protrusion 44, interference between the electronic device 35 and the intermediate protrusion 45 is suppressed. As a result, the first support and the second support are possible.

The present disclosure is not limited to the present embodiments described above, and includes all changes and modifications without departing from the technical scope or the essence of the present disclosure defined by the claims.

The invention claimed is:

1. A device storage holder for a vehicle, the device storage holder disposed at a side of a vehicle seat including a seat slide mechanism, and the device storage holder housing a flat electronic device, the device storage holder comprising:
   a body; and
   a support arm extending in vehicle width direction, the support arm disposed forward of and separated from the body,
   wherein the body comprises a backward inclined surface, a lower protrusion, and an upper protrusion, all of which are formed on a front end portion of the body,
   the backward inclined surface faces forward, with the top of the backward inclined surface being disposed rearward to the bottom of the backward inclined surface,
   the lower protrusion is disposed below the backward inclined surface, and protrudes forward from the backward inclined surface,
   the upper protrusion is disposed above the backward inclined surface, and protrudes forward from the backward inclined surface,
   a rear surface of the support arm comprises a lower inclined surface and an upper inclined surface, and the upper inclined surface is connected to an upper end of the lower inclined surface, and
   in a side view, an extension from the lower inclined surface intersects an upper surface of the lower protrusion, and in a side view, an extension from the upper inclined surface intersects the backward inclined surface.

2. The device storage holder for a vehicle according to claim 1, wherein
   a convex portion is formed at a front end of the upper inclined surface, and an angle between a lower surface of the upper protrusion and a horizontal plane is smaller than an angle between the upper inclined surface and the horizontal plane.

3. The device storage holder for a vehicle according to claim 2, wherein
   an edge of a front end lower portion of the upper protrusion has a curved surface shape, and the convex portion has a curved surface shape.

4. The device storage holder for a vehicle according to claim 1, wherein
   a front end of the upper protrusion is disposed rearward to a front end of the lower protrusion.

5. The device storage holder for a vehicle according to claim 1 further comprising an intermediate protrusion formed on the backward inclined surface,
   wherein, in a side view, the intermediate protrusion is formed below an intersection of the extension from the upper inclined surface and the backward inclined surface, and the intermediate protrusion protrudes forward from the backward inclined surface, and
   wherein the intermediate protrusion is shorter than the lower protrusion and the upper protrusion.

* * * * *